(12) United States Patent
Rukavina

(10) Patent No.: US 8,444,076 B2
(45) Date of Patent: May 21, 2013

(54) BLENDER BLADE

(75) Inventor: Steve Rukavina, Rocky River, OH (US)

(73) Assignee: Vita-Mix Corporation, Olmsted Township, OH (US)

( * ) Notice: Subject to any disclaimer, the term of this patent is extended or adjusted under 35 U.S.C. 154(b) by 375 days.

(21) Appl. No.: 12/895,218

(22) Filed: Sep. 30, 2010

(65) Prior Publication Data

US 2012/0080549 A1    Apr. 5, 2012

(51) Int. Cl.
  *B02C 18/16* (2006.01)
(52) U.S. Cl.
  USPC .................................. 241/282.1; 241/292.1
(58) Field of Classification Search
  USPC .................. 241/282.1, 282.2, 292.1; 366/343
  See application file for complete search history.

(56) References Cited

U.S. PATENT DOCUMENTS

| | | | |
|---|---|---|---|
| 2,788,038 A * | 4/1957 | Corcoran | ............... 241/292.1 |
| 3,175,594 A | 3/1965 | Jepson et al. | |
| 6,834,818 B2 | 12/2004 | Lee | |
| 7,278,598 B2 | 10/2007 | Katz et al. | |
| 7,552,885 B2 | 6/2009 | Katz et al. | |

FOREIGN PATENT DOCUMENTS

EP    2210542    7/2010

OTHER PUBLICATIONS

ISA, International Search Report and the Written Opinion, Nov. 29, 2010, PCT Application PCT/US2010/050934 owned by Vita-Mix Corporation.

* cited by examiner

*Primary Examiner* — Mark Rosenbaum
(74) *Attorney, Agent, or Firm* — McDonald Hopkins LLC

(57) ABSTRACT

A blender blade or blade for being mounted to an interior base of a blender container for rotation about a vertical axis is described. The blade includes at least two blade wings, such that it may include four blade wings. The blade includes a body, first transition section, second transition section, first blade wing and second blade wing. Body includes an aperture, wherein the body is located on a first horizontal plane. First and second transition sections extend at downward angles from opposite sides of the body. First blade wing extends outwardly from the first transition section, wherein the first blade wing is located on a second horizontal plane. Second blade wing extends outwardly from the second transition section, wherein the second blade wing is located on a third horizontal plane. The blade is a one-piece blade and can process approximately 6-48 ounces of working medium.

10 Claims, 8 Drawing Sheets

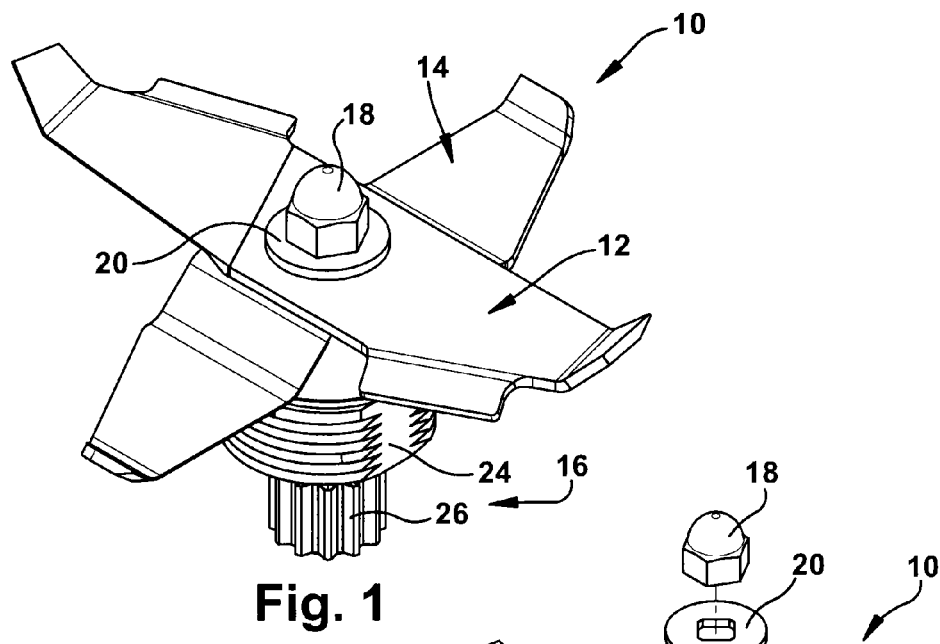
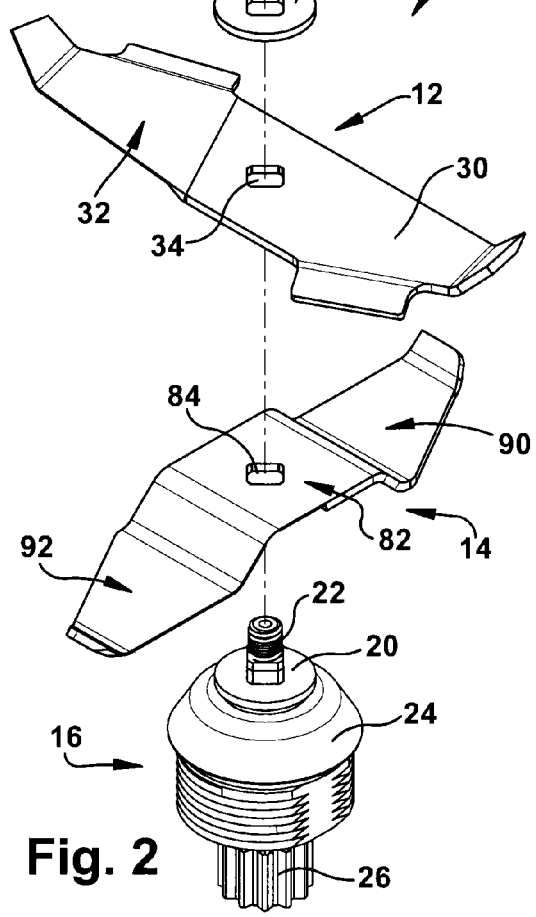

BLENDER BLADE

FIELD OF THE INVENTION

The present invention generally relates to blenders and, more particularly, to a blade for use in a blender.

BACKGROUND

Very popular beverages today are those commonly referred to as "frozen" drinks or smoothies, whereby a portion of liquid, which may often include a quantity of liquor and/or a flavored drink mix, and a portion of ice may be mixed together in a blending apparatus or blender having blades to create an almost slush-like drink.

Generally, a blender blade may have two blade wings extending in opposite directions from a blade body. Each of the two blade wings may be equipped with cutting surfaces along their leading edges. During operation of a blender, the blender blade may rotate about an axis of rotation, and the cutting surfaces may cut through the working medium provided in the blender container. Oftentimes, the blade wings may be angled in relation to the blade body to provide the blade wings with angles of attack. Varying the angles of attack of the blade wings may be used to control the axial flow of the working medium.

In order to understand the consequences of angling the blade wings in relation to the blade body, the angle of attack in relation to airfoils must be understood. With airfoils, the angle of attack may be determined in relation to the chord line of the airfoil. The chord line is the line drawn from the leading edge to the trailing edge of the airfoil, and the angle of attack is the angle formed between the chord line and horizontal. As the angle of attack of the airfoil is varied, the "lift" generated by the airfoil is also varied.

For example, when an airfoil has a positive angle of attack, the flowing medium may impinge on the lower surface of the airfoil. Consequently, the angle of attack may cause the lower surface to deflect the flowing medium away from the airfoil. The amount of deflection is related to the orientation of the airfoil. That is, there is more deflection when there is a high angle of attack and less deflection when there is a low angle of attack. Such deflection generates low pressures adjacent the upper surface of the airfoil.

For example, the lower surface may push flowing medium away from the path of the airfoil, and an absence of flowing medium may thereby be created adjacent to the upper surface of the airfoil. Due to this absence of flowing medium, low pressures are provided adjacent the upper surface, and these low pressure generate the above-discussed lift. As such, higher angles of attack produce lower pressures adjacent the upper surface to generate more lift, and lower angles of attack produce lower pressures adjacent the upper surface to generate less lift.

The lift generated by the angle of attack of the above-discussed airfoil can be equated with the axial flow generated by the angle of attack of a blade wing. However, unlike the above discussed airfoil, the angle of attack of a blade wing may be determined by the forward or rearward "twist" of the blade wing (relative to its leading edge) along its longitudinal length. This twist determines how much working medium impinges the upper surface or lower surface of the blade wing. Without such impingement of working medium, the angle of attack would effectively be zero. For example, if the blade wing was angled upwardly or downwardly (but not twisted forwardly or rearwardly), the working medium would not impinge the blade wing, and the angle of attack of such a blade wing would be effectively zero.

To create the necessary angle of attack, the blade wing may be twisted forwardly or rearwardly. When the blade wing is twisted forwardly, the working medium impinges the upper surface, and when the blade wing is twisted rearwardly, the working medium impinges the lower surface. The amount of twisting determines the amount of impingement, and amount of axial flow, while the direction of the twisting (forwardly or rearwardly relative to its leading edge) determines the direction of the axial flow.

For example, if the blade wing is twisted forwardly relative to its leading edge, the working medium will impinge the upper surface of the blade wing, and low pressures will be generated adjacent the lower surface, thereby drawing working medium from above to below the blender blade. On the other hand, if the blade wing is twisted rearwardly relative to its leading edge, the working medium will impinge the lower surface, and low pressure will be generated adjacent the upper surface, thereby drawing working medium from below to above the blender blade. Either way, working medium is drawn through the cutting pattern of the blade wing.

Traditionally, if it was desired to process or blend smaller amounts of working medium, such as 6 ounces to 12 ounces of working medium, an operator would utilize a smaller container or a container having a narrow base. In addition, if it was desired to process or blend larger amounts of working medium, such as from 12 ounces to over 48 ounces, the operator would utilize a larger container or a container having a wide base. Utilizing a narrow based container to process larger volumes of working medium, however, may not be desirable, as a narrow based container may have problems processing volumes of material over 32 ounces. Conversely, the same may be true. Utilizing a wide based container to process smaller volumes of working medium may also not be desirable.

SUMMARY

A blender blade is described. The blender blade may be mounted to an interior base of a blender container for rotation about a vertical axis. A first embodiment of the blender blade may include a body, a first blade wing, a first transition section, a second blade wing, a third blade wing, a second transition section and a fourth blade wing. The body may include an aperture, wherein the body may be located on a first horizontal plane. The first blade wing may extend outwardly from the body along the first horizontal pane. The first transition section may extend outwardly at an angle from the body, wherein the second blade wing that may extend outwardly from the first transition section. The third blade wing may not be coplanar with the first horizontal plane and may extend outwardly from the body at an angle. The second transition section may extend outwardly at an angle from the body, wherein the fourth blade wing may extend outwardly from the second transition section. At least one of the second and fourth blade wings may be located on a second horizontal plane. For example, the second blade wing may be located on the second horizontal plane the fourth blade wing may be located on a third horizontal plane. In addition, the first blade wing and third blade wing may each include a wing flap that may extend downwardly at an angle from the respective blade wing. The first, second, third and fourth blade wings may each include a wing tip that may extend at an upward angle therefrom. The blender blade may be a one-piece metal blade. The blender blade may process as little as 6 ounces up to approximately 48 ounces of working medium.

A second embodiment of the blender blade may include a body, a first transition section, a second transition section, a first blade wing and a second blade wing. The body may include an aperture, wherein the body may be located on a first horizontal plane. The first transition section may extend at a downward angle from a side of the body. The second transition section may extend at a downward angle from an opposite side of the body. The first blade wing may extend outwardly from the first transition section, wherein the first blade wing may be located on a second horizontal plane. The second blade wing may extend outwardly from the second transition section, wherein the second blade wing may be located on a third horizontal plane. The first blade wing may include a first wing tip that may be distally located from the body. The blender blade may be a one-piece metal blade. The blender blade may process as little as 6 ounces up to approximately 48 ounces of working medium.

BRIEF DESCRIPTION OF THE DRAWINGS

Objects and advantages together with the operation of the invention may be better understood by reference to the following detailed description taken in connection with the following illustrations, wherein:

FIG. 1 illustrates a perspective view of a blade assembly in an embodiment of the present invention.

FIG. 2 illustrates a partially exploded perspective view of the blade assembly of FIG. 1.

DETAILED DESCRIPTION

Figure 3:
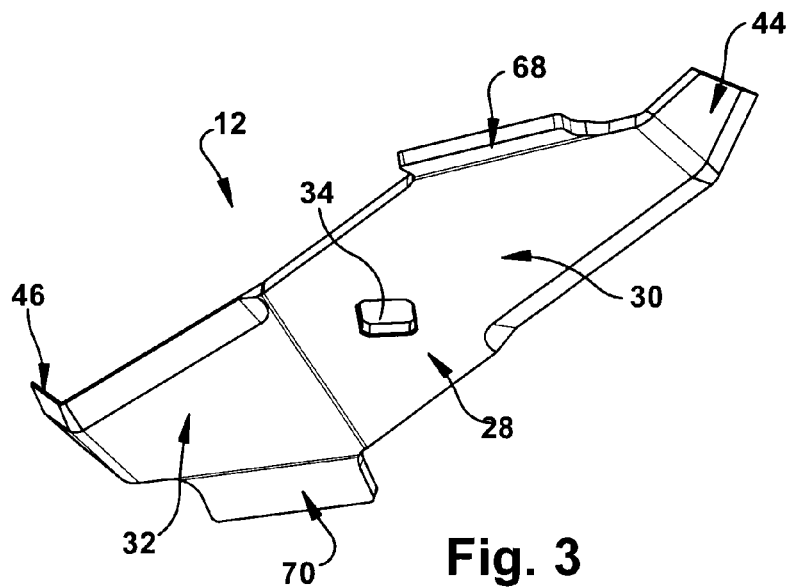
FIG. 3 illustrates a bottom perspective view of a first blade of the blade assembly of FIG. 1.

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

A blade assembly 10 made in accordance with an embodiment of the present invention is illustrated in FIGS. 1 and 2. The blade assembly 10 may be of any appropriate shape, size, type or configuration. The blade assembly 10 may be utilized for any appropriate purpose. For example, the blade assembly 10 may be utilized in a blending apparatus to make a blended beverage, such as a drink made with a portion of liquid and a portion of ice, as may often be prepared and served in restaurants, cocktail lounges, or the like.

The blade assembly 10 may be utilized within any appropriate blender container (not shown). The blender container may be of any appropriate shape, size, type or configuration. For example, the blender container may be container having a narrow base or a container having a wide base. Traditionally, if it was desired to process or blend smaller amounts of working medium, such as 6 ounces of working medium, an operator would utilize a smaller container or a container having a narrow base.

The narrow based container would aid the blade assembly to manipulate a lower volume of working medium, whereby it may pile up more and be more effectively manipulated or blended. Utilizing a narrow based container to process larger volumes of working medium, however, may not be desirable, as a narrow based container may have problems processing volumes of material over 32 ounces.

Traditionally, if it was desired to process or blend larger amounts of working medium, such as from 12 ounces to over 48 ounces, the operator would utilize a larger container or a container having a wide base. The wide based container would aid a blade assembly to process up to or over 48 ounces of working medium.

The blade assembly 10 may be utilized in either a narrow based container or a wide based container. Moreover, the blade assembly 10 may be utilized to process as little as 6 ounces up to approximately 48 ounces of working medium in a wide based container.

The blade assembly 10 may include a first blade 12, a second blade 14 and a mounting assembly 16 (FIGS. 1 and 2). The mounting assembly 16 may be of any appropriate shape, size, type or configuration and include any appropriate number of types of components. For example, the mounting assembly 16 may include a nut 18, at least one washer 20, a shaft 22, a base mount or mount 24 and a spline 26 (FIGS. 1 and 2). The mounting assembly 16 may also include any other various components (not shown). The nut 18 may be of any appropriate shape, size, type or configuration, such as an acorn nut or a cap nut. The mounting assembly 16 may include any appropriate number of washers 20, such as a pair of washers. The washers 20 may be of any appropriate shape, size, type or configuration.

The shaft 22 may be of any appropriate shape, size, type or configuration, such as blender shaft. The mount 24 may be of any appropriate shape, size, type or configuration, such as of a generally cone shaped configuration that may include a lower threaded section. For example, when assembled the cone shaped configuration of the mount 24 may comprise a general downward angle relative to the shaft 22. The spline 26 may be of any appropriate shape, size, type or configuration.

In a non-limiting example, when assembled, the spline 26 may be secured to an end of the shaft 22 and the mount 22 may be engaged with the shaft 22, such as at a location above the spline 26. There may also be a washer 20 located on the shaft 22, such as located above the mount 22. When assembled, the first blade 12 may be located above the second blade 14, whereby the blades 12, 14 may be located above the washer 20 on the shaft 22. The blades 12, 14 may be secured to the shaft 22 by another washer 20 and the nut 18 (FIGS. 1 and 2).

The first blade 12 is illustrated in FIGS. 3-7. The first blade 12 may be of any appropriate shape, size, type or configuration, such as of a generally parallelogram configuration. U.S. Pat. No. 7,278,598, which is herein incorporated by reference in its entirety, describes in further detail such a blade and its mode(s) of operation. The first blade 12 may include a body portion 28 having an aperture 34 (FIGS. 3-7). The aperture 34 may be of any appropriate shape, size, type or configuration, such as of a generally square or circular configuration. The aperture 34 may be located at any appropriate position on the first blade 12, such as located at an approximately central location on the body portion 28 (FIGS. 3-7).

The aperture 34 may be of a shape and size to receive the blender shaft 22 to which the first blade 12 may be fixedly attached. The blender shaft 22 may rotate in any appropriate direction to drive the movement of first blade 12 inside a blender container. As such, the center of the aperture 34 and the blender shaft 22 may define an axis of rotation of the first blade 12 (FIG. 2).

Figure 4:
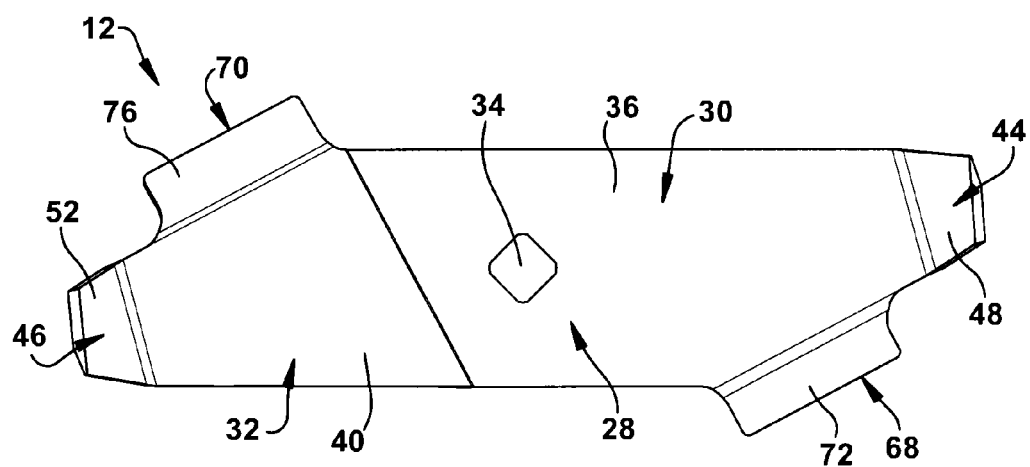
FIG. 4 illustrates a top view of the first blade of FIG. 3.
Figure 5:
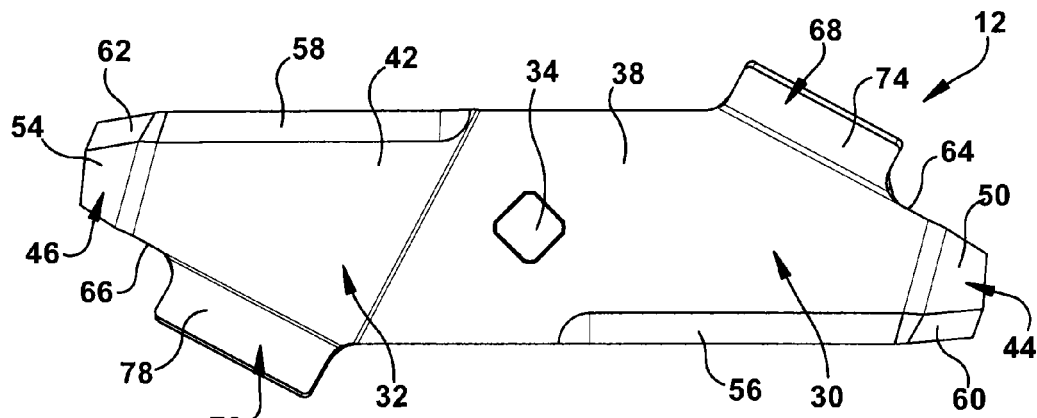
FIG. 5 illustrates a bottom view of the first blade of FIG. 3.
Figure 6:
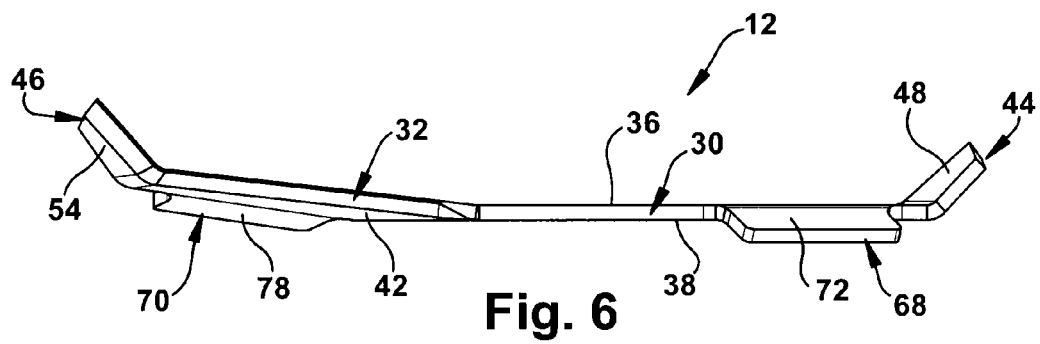
FIG. 6 illustrates a front view of the first blade of FIG. 3.
Figure 7:
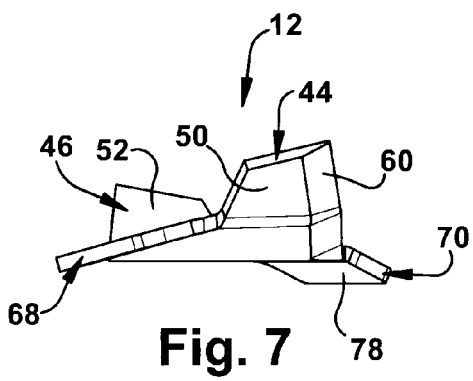
FIG. 7 illustrates a side view of the first blade of FIG. 3.
Figure 8:
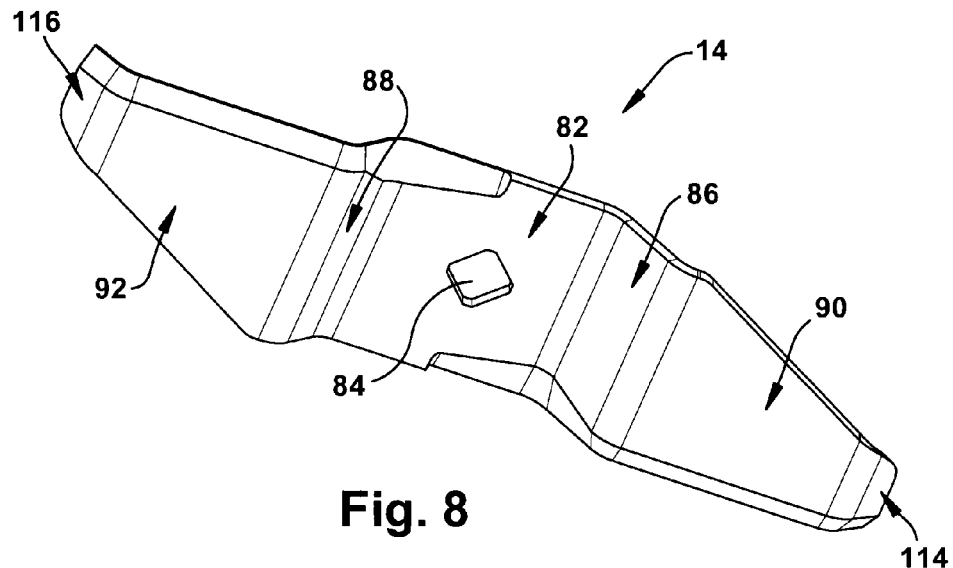
FIG. 8 illustrates a bottom perspective view of a second blade of the blade assembly of FIG. 1.

The first blade 12 may be configured for counter-clockwise rotation in the blender container. The first blade 12 may include a first blade wing 30 and a second blade wing 32 (FIGS. 3-7). The first blade wing 30 may be of any appropriate shape, size, type or configuration, such as of a generally polygonal configuration. The first blade wing 30 may be located at any appropriate position on the first blade 12, such as located on one side of the body portion 28 (FIGS. 3-7). The first blade wing 30 may include an upper surface 36 and a lower surface 38 (FIGS. 4-6).

The second blade wing 32 may be of any appropriate shape, size, type or configuration, such as of a generally polygonal configuration (FIGS. 3-7). The second blade wing 32 may be located at any appropriate position on the first blade 12, such as located on a side of the body portion 28 opposite that of the first blade wing 30 (FIGS. 3-6). For example, the first blade wing 30 and the second blade wing 32 may extend outwardly from the body portion 28. The second blade wing 32 may include an upper surface 40 and a lower surface 42.

The first blade wing 30 and second blade wing 32 may be asymmetrically disposed relative to body portion 28. For example, first blade wing 30 may share the same horizontal plane as the body portion 28. Consequently, the body portion 28 and the first blade wing 30 may be uniformly connected, whereby there may be a smooth transition between their respective upper and lower surfaces.

The second blade wing 32, unlike the first blade wing 30, may be oriented at any appropriate angle, such as an acute angle, with respect to the horizontal plane shared by the body portion 28 and the first blade wing 30. In other words, the upper surface 40 of the second blade wing 32 may be obtusely oriented with respect to the body portion 28, and the lower surface 42 may be reflexively oriented with respect to the body portion 28 (FIG. 6).

The first blade wing 30 may include a first wing tip 44 and the second blade wing 32 may include a second wing tip 46 (FIGS. 3-7). The wing tips 44, 46 may be of any appropriate shape, size, type or configuration, such as of a generally polygonal configuration. The wing tips 44, 46 may be located at any appropriate position on the first blade wing 30 and second blade wing 32, respectively. For example, the first wing tip 44 and second wing tip 46 may extend outwardly from distal ends of the first blade wing 30 and second blade wing 32, respectively (FIGS. 3-6).

The wing tips 44, 46 may each include an upper surface 48, 52 and a lower surface 50, 54, respectively (FIGS. 4-7). The upper surfaces 48, 52 may be oriented at obtuse angles with respect to the upper surfaces 36, 40 of the blade wings 30, 32. These angled relationships between the first blade wing 30 and first wing tip 44 and between the second blade wing 32 and second wing tip 46 may increase the dimensions of the cutting patterns of the first blade 12.

The first blade wing 30 and the second blade wing 32 may each include at least one leading edge 56, 58, respectively. The leading edges 56, 58 may be of any appropriate shape, size, type or configuration, such as of a generally beveled configuration. The leading edges 56, 58 may be located at any appropriate position on the respective blade wing 30, 32, such as located at a side of the respective blade wing 30, 32 (FIG. 5).

The first wing tip 44 and the second wing tip 46 may each include at least one leading edge 60, 62, respectively. The leading edges 60, 62 may be of any appropriate shape, size, type or configuration, such as of a generally beveled configuration. The leading edges 60, 62 may be located at any appropriate position on the respective wing tip 44, 46, such as located at a side of the respective wing tip 44, 46 (FIG. 5).

The cutting patterns of the first blade 12 may be defined by the leading edges 56, 58 of the first blade wing 30 and second blade wing 32, respectively, and by the leading edges 60, 62 of the first wing tip 44 and second wing tip 46, respectively. Each of these leading edges 56, 58, 60, 62 may be sharpened by respectively beveling the first blade wing 30, second blade wing 32, first wing tip 44 and second wing tip 46.

The first blade wing leading edge 56 and the first wing tip leading edge 60 may be formed along one side of the first blade 12 and may share cutting responsibilities along that side of the blade 12. The second blade wing leading edge 58 and the second wing tip leading edge 62 may be formed along the other side of first blade 12 and may share cutting responsibilities along that side of the blade 12. Therefore, as the first blade 12 rotates counter-clockwise about its axis of rotation, the leading edges 56, 60 located on one side and the leading edges 58, 62 located on the other side of the first blade 12 may cut through the working medium provided in the blender container.

Since the first blade wing 30 and the second blade wing 32 may be asymmetrically oriented with respect to the body portion 28, the first blade 12 may have two cutting patterns. The first cutting pattern may be substantially planar and may be formed by the leading edge 56 of the first blade wing 30 and the leading edge 60 of the first wing tip 44. The second cutting pattern may be substantially frusto-conical and may be formed by the leading edge 58 of the second blade wing 32 and the leading edge 62 of the second wing tip 46.

The first blade wing 30 may include at least one trailing edge 64 and the second blade wing 32 may include at least one trailing edge 66 (FIG. 5). The trailing edges 64, 66 may be of any appropriate shape, size, type or configuration. The trailing edges 64, 66 may be located at any appropriate position on the respective blade wing 30, 32, such as located at a side of the respective blade wing 30, 32 (FIG. 5). For example, the trailing edges 64, 66 may be located adjacent to the respective wing tip 44, 46.

The first blade wing 30 may include a first wing flap 68 and the second blade wing 32 may include a second wing flap 70. The wing flaps 68, 70 may be of any appropriate shape, size, type or configuration, such as of a generally rectangular configuration. The wing flaps 68, 70 may be located at any appropriate position on the respective blade wing 30, 32, such as generally opposite that of the respective leading edges 56, 58 (FIGS. 3-7). For example, the first wing flap 68 and second wing flap 70 may extend outwardly at an angle from the trailing edges 64, 66 of the first blade wing 30 and second blade wing 32, respectively. The wing flaps 68, 70 may each include an upper surface 72, 76 and a lower surface 74, 78, respectively. The lower surfaces 74, 78 of the wing flaps 68, 70 may be oriented at an obtuse angle with respect to the lower surfaces 38, 42 of the blade wings 30, 32.

The wing flaps 68, 70 may be provided to control the axial flow of the working medium relative to the first cutting pattern and second cutting pattern irrespective of the angle of attack of the first blade wing 30 and the second blade wing 32. For example, the wing flaps 68, 70 may be positioned at any appropriate angle, such as angled downwardly or upwardly, to respectively increase the effective camber of the upper surfaces 36, 40 and the lower surfaces 38, 42 of the blade wings 30, 32, respectively.

Due to the effective camber increase resulting from the addition of the wing flaps 68, 70, low pressures may be generated by the wing flaps 68, 70. The low pressures generated by the wing flaps 68, 70 may compel axial movement of the working medium.

In a non-limiting example, in use, as the first blade 12 is rotating, the working medium flowing underneath first blade 12 may impinge the downwardly angled wing flaps 68, 70. As such, the lower surfaces 74, 78 of the wing flaps 68, 70 may deflect the working medium away from the first blade 12. Such deflection may cause the wing flaps 68, 70 to batter against the working medium, as well as push the working medium away from the path of the wing flaps 68, 70, thereby generating low pressures adjacent to the upper surfaces 72, 76 of the wing flaps 68, 70.

The low pressures generated by the downwardly angled wing flaps 68, 70 may draw the working medium to the upper surfaces 72, 76 of the wing flaps 68, 70. Moreover, because the upper surface 72 is below the leading edges 56, 60 of the first blade wing 30, and the upper surface 76 is below the leading edges 58, 62 of the second blade wing 32, the working medium may be drawn downwardly through the first cutting pattern and second cutting pattern. As such, the downward angle of the wing flaps 68, 70 and the axial movement caused thereby may enhance the cutting ability of the first blade 12.

The opposite holds true if the wing flaps 68, 70 are angled upwardly. For example, as the first blade 12 is rotating, the working medium flowing above the first blade 12 may impinge the upwardly angled wing flaps 68, 70. As such, the upper surfaces 72, 76 of the wing flaps 68, 70 may deflect the working medium away from the path of the wing flaps 68, 70. In the process of deflecting the working medium, the wing flaps 68, 70 may batter against the working medium, thereby generating low pressures adjacent to the lower surfaces 74, 78. These low pressures may draw the working medium to the lower surfaces 74, 78. Since the lower surface 74 would be located above the leading edges 56, 60 and the lower surface 78 would be located above the leading edges 58, 62, the working medium may be drawn upwardly through the first cutting pattern and second cutting pattern. As such, the upward angle of the wing flaps 68, 70 and the axial movement caused thereby may enhance the cutting ability of the first blade 12.

Whether the wing flaps 68, 70 are angled upwardly or downwardly, the amount of working medium flowing across the first cutting pattern and second cutting pattern may be increased by increasing the slopes of the wing flaps 68, 70. Furthermore, as discussed above, the downward and upward angle of the first wing flap 68 may draw the working medium downwardly and upwardly, respectively, through the first cutting pattern. Therefore, with reference to the first blade wing 30 (which has an angle of attack of zero), the amount and direction of the axial flow of the working medium may be controlled by the first wing flap 68 irrespective of the angle of attack of the first blade wing 30.

In addition to controlling the axial flow of the working medium, the orientation of the wing flaps 68, 70 may also control the radial flow of the working medium relative to the axis of rotation of the first blade 12. For example, the wing flaps 68, 70 may be canted inwardly relative to the leading edges 56, 58, respectively. That is, because the first blade wing 30 and second blade wing 32 may gradually narrow as the blade wings 30, 32 may extend outwardly from the body portion 28, the trailing edges 64, 66 may be angled such that the wing flaps 68, 70 may be canted inwardly. As such, the working medium deflected away from the path of the wing flaps 68, 70 as the first blade 12 is rotating may be pushed radially inwardly relative to the first blade wing 30 and second blade wing 32, respectively.

The opposite holds true if the wing flaps 68, 70 are canted outwardly relative to the leading edges 56, 58, respectively. For example, if the first blade wing 30 and second blade wing 32 gradually broaden as the blade wings 30, 32 extend outwardly from the body portion 28, the trailing edges 64, 66 may be angled such that the wing flaps 68, 70 may be canted outwardly. As such, the working medium deflected away from the path of the wing flaps 68, 70 as the first blade 12 is rotating may be pushed radially outwardly relative to the first blade wing 30 and second blade wing 32, respectively.

Therefore, both axial and radial flow may be controlled by the orientation of the wing flaps 68, 70. Moreover, when the wing flaps 68, 70 are angled downwardly, the wing flaps 68, 70 may also be used to dislodge working medium from underneath the first blade 12, which after being dislodged, may then be acted on by the first cutting pattern and second cutting pattern.

Figure 9:
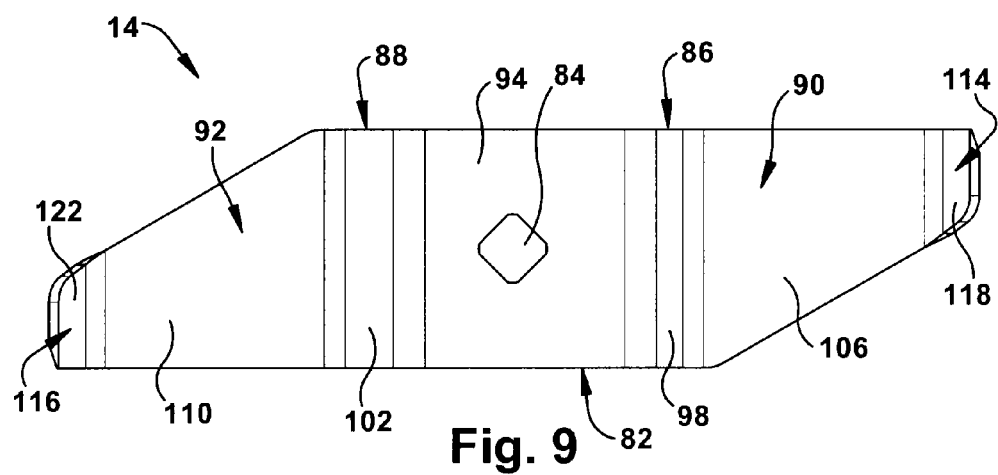
FIG. 9 illustrates a top view of the second blade of FIG. 8.
Figure 10:
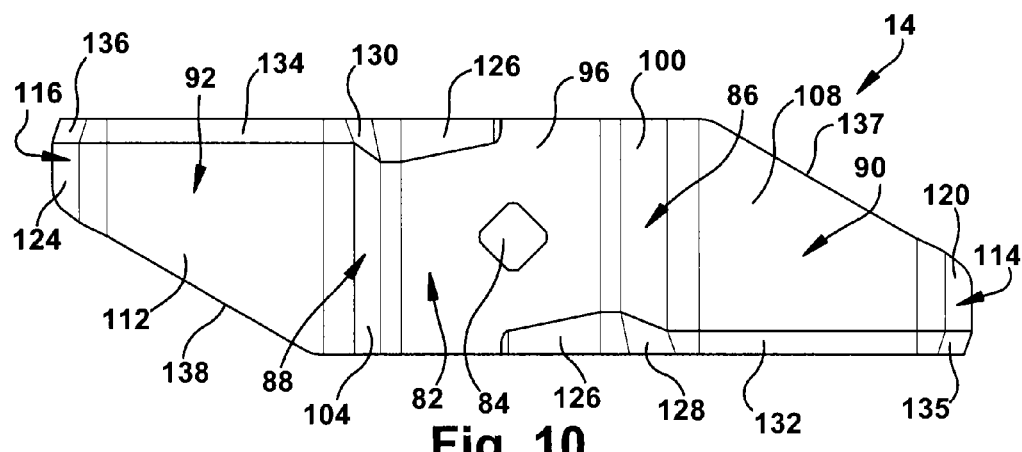
FIG. 10 illustrates a bottom view of the second blade of FIG. 8.
Figure 11:
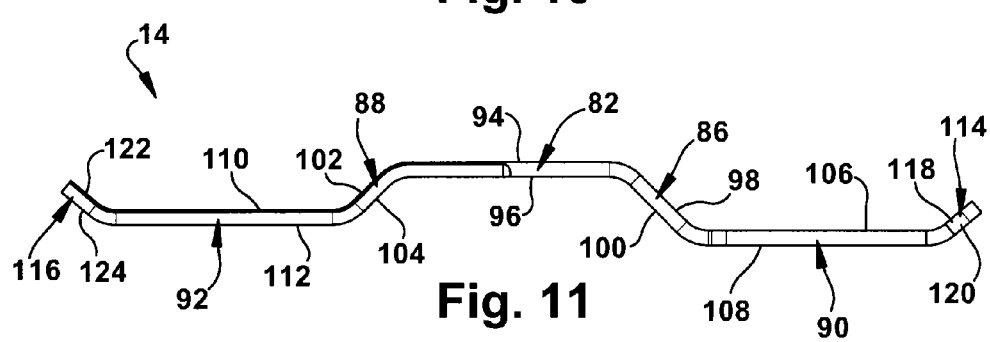
FIG. 11 illustrates a front view of the second blade of FIG. 8.

As stated above, the blade assembly 10 may include a second blade 14 (FIGS. 1 and 2). The second blade 14 is illustrated in FIGS. 8-12. The second blade 14 may be of any appropriate shape, size, type or configuration, such as of a generally parallelogram configuration. The second blade 14 may include a body portion 82 (FIGS. 8-11). The body portion 82 may be of any appropriate shape, size, type or configuration, such as of a generally rectangular configuration. The body portion 82 may be located at any appropriate position on the second blade 14, such as at an approximately central location. The body portion 82 may include an upper surface 94 and a lower surface 96 (FIGS. 9-11).

The body portion 82 may include an aperture 84 (FIGS. 8-11). The aperture 84 may be of any appropriate shape, size, type or configuration, such as of a generally square or circular configuration. The aperture 84 may be located at any appropriate position on the second blade 14, such as located at an approximately central location on the body portion 82.

Like the aperture 34 of the first blade 12, the aperture 84 may be of a shape and size to receive the blender shaft 22 (FIG. 2). The second blade 14 may also be fixedly attached to the blender shaft 22. The blender shaft 22 may rotate in any appropriate direction to drive the movement of the second blade 14 inside the blender container. As such, the center of the aperture 84 and the blender shaft 22 may define an axis of rotation of the second blade 14 (FIG. 2). The axis of rotation of the first blade 12 and the axis of rotation of the second blade 14 may be the same. The second blade 14 may be configured for counter-clockwise rotation in the blender container, whereby the second blade 14 may rotated in the same direction as the first blade 12.

Figure 12:
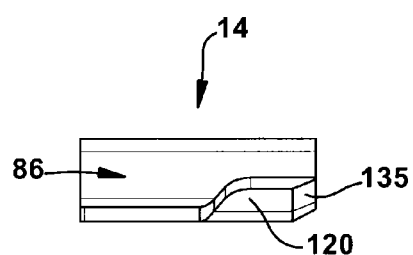
FIG. 12 illustrates a side view of the second blade of FIG. 8.

The second blade 14 may include a first transition section 86 and a second transition section 88 (FIGS. 8-11). The transition sections 86, 88 may be of any appropriate shape, size, type or configuration, such as of a generally rectangular configuration. The transition sections 86, 88 may be located at any appropriate position on the second blade 14, such as located on opposite sides of the body portion 82. For example, the first transition section 86 may extend outwardly and at an angle away from one side of the body portion 82, and the second transition section 88 may extend outwardly and at an angle away from the opposite side of the body portion 82 (FIGS. 11 and 12). The transition sections 86, 88 may extend outwardly at a downward angle that may be similar or approximate to the angle of the mount 24, whereby the downward angles of the transition sections 86, 88 may correspond to the angle of the mount 24.

The second transition section 88 may be slightly larger than the first transition section 86, whereby the second transition section 88 may extend farther downwards than the first transition section 86 (FIG. 11). The transition sections 86, 88 may each include an upper surface 98, 102 and a lower surface 100, 104, respectively (FIGS. 9-11). The transition sections 86, 88 may extend away from the body portion 82 at any appropriate angles. For example, the transition sections 86, 88 may extend away from the body portion 82 at approximately similar or differing angles. The transition sections 86, 88 may extend away from the lower surface 96 of the body portion 82 at obtuse angles. In other words, the lower surfaces 100, 104 of the transition sections 86, 88 may be obtusely oriented with respect to the lower surface 96 of the body portion 82 (FIG. 11).

The second blade 14 may include a first blade wing 90 and a second blade wing 92 (FIGS. 8-11). The first blade wing 90 may be of any appropriate shape, size, type or configuration, such as of a generally polygonal configuration. The first blade wing 90 may be located at any appropriate position on the second blade 14, such as located on one side of the body portion 82 (FIGS. 8-11). For example, the first blade wing 90 may be located and extend from the first transition section 86. The first blade wing 90 may include an upper surface 106 and a lower surface 108 (FIGS. 9-11).

The second blade wing 92 may be of any appropriate shape, size, type or configuration, such as of a generally polygonal configuration. The second blade wing 92 may be located at any appropriate position on the second blade 14, such as located on a side of the body portion 82 opposite that of the first blade wing 90 (FIGS. 8-11). For example, the second blade wing 92 may be located and extend from the second transition section 88. The second blade wing 92 may include an upper surface 110 and a lower surface 112.

The first blade wing 90 and second blade wing 92 may be asymmetrically disposed or may be a general opposite mirror image of one another relative to body portion 82. The body portion 82, first transition section 86 and first blade wing 90 may all be uniformly connected, whereby there may be a smooth transition between their respective upper surfaces 94, 98, 106 and lower surfaces 96, 100, 108 (FIGS. 8-11). Similarly, the body portion 82, second transition section 88 and second blade wing 92 may all be uniformly connected, whereby there may be a smooth transition between their respective upper surfaces 94, 102, 110 and lower surfaces 96, 104, 112.

The first blade wing 90 may be oriented at any appropriate angle, such as an obtuse angle with respect to the first transition section 86. In other words, the upper surface 106 of the first blade wing 90 may be obtusely oriented with respect to the upper surface 98 of the first transition section 86 (FIG. 11). The second blade wing 92 may be oriented at any appropriate angle, such as an obtuse angle with respect to the second transition section 88. In other words, the upper surface 110 of the second blade wing 92 may be obtusely oriented with respect to the upper surface 102 of the second transition section 88. The body portion 82, first blade wing 90 and second blade wing 92 may all generally be parallel to one another.

The first blade wing 90 may include a first wing tip 114 and the second blade wing 92 may include a second wing tip 116. The wing tips 114, 116 may be of any appropriate shape, size, type or configuration, such as of a generally polygonal configuration. The wing tips 114, 116 may be located at any appropriate position on the first blade wing 90 and second blade wing 92, respectively. For example, the first wing tip 114 and second wing tip 116 may extend outwardly from distal ends of the first blade wing 90 and second blade wing 92, respectively (FIGS. 8-11).

The wing tips 114, 116 may each include an upper surface 118, 122 and a lower surface 120, 124, respectively (FIGS. 9-11). The upper surfaces 118, 122 may be oriented at obtuse angles with respect to the upper surfaces 106, 110 of the blade wings 90, 92. These angled relationships between the first blade wing 90 and first wing tip 114 and between the second blade wing 92 and second wing tip 116 may increase the dimensions of the cutting patterns of the second blade 14.

The body portion 82 may include at least one leading edge 126. For example, the body portion 82 may include a pair of leading edges 126. The leading edges 126 may be of any appropriate shape, size, type or configuration, such as of a generally beveled configuration. The leading edges 126 may be located at any appropriate position on the body portion 82, such as located at opposite sides and corners of the body portion 82 (FIG. 10).

The first transition section 86 and second transition section 88 may each include at least one leading edge 128, 130, respectively. The leading edges 128, 130 may be of any appropriate shape, size, type or configuration, such as of a generally beveled configuration. The leading edges 128, 130 may be located at any appropriate position on the respective transition section 86, 88, such as located at a side of the respective transition section 86, 88 (FIG. 10).

The first blade wing 90 and the second blade wing 92 may each include at least one leading edge 132, 134, respectively. The leading edges 132, 134 may be of any appropriate shape, size, type or configuration, such as of a generally beveled configuration. The leading edges 132, 134 may be located at any appropriate position on the respective blade wing 90, 92, such as located at a side of the respective blade wing 90, 92 (FIG. 10).

The first wing tip 114 and the second wing tip 116 may each include at least one leading edge 135, 136, respectively. The leading edges 135, 136 may be of any appropriate shape, size, type or configuration, such as of a generally beveled configuration. The leading edges 135, 136 may be located at any appropriate position on the respective wing tip 114, 116, such as located at a side of the respective wing tip 114, 116 (FIG. 10).

The cutting patterns of the second blade 14 may be defined by the leading edges 126, 128, 132, 135 of the body portion 82, first transition section 86, first blade wing 90 and first wing tip 114, respectively. The cutting patterns of the second blade 14 may also be defined by the leading edges 126, 130, 134, 136 of the body portion 82, second transition section 88, second blade wing 92 and second wing tip 116, respectively. Each of these leading edges 126, 128, 130, 132, 134, 135, 136 may be sharpened by respectively beveling the body portion 82, first transition section 86, second transition section 88, first blade wing 90, second blade wing 92, first wing tip 114 and second wing tip 116.

The leading edges 126, 128, 132, 135 of one side of the blade 14 may all be formed along one side of the second blade 14 and may form a general continuous beveled surface or leading edge from the approximate center of the body portion 82 all the way to the wing tip 114, and may share cutting responsibilities along that side of the second blade 14 (FIG. 10). In addition, the leading edges 126, 130, 134, 136 of the opposite side of the blade 14 may all be formed along the other side of the second blade 14 and may form a general continuous beveled surface or leading edge from the approximate center of the body portion 82 all the way to the wing tip 116, and may share cutting responsibilities along that side of the second blade 14 (FIG. 10). Therefore, as the second blade 14 rotates about its axis of rotation, the leading edges 126, 128, 132, 135 located on one side and the leading edges 126, 130, 134, 136 located on the other side of the second blade 14 may cut through the working medium provided in the blender container.

The second blade 14 may have two cutting patterns. The first cutting pattern may be substantially planar and may be formed by the leading edges 26, 128, 132, 135. The second cutting pattern may also be substantially planar and may be formed by the leading edges 26, 130, 134, 136. In addition, the first blade wing 90 may be located slightly lower than the second blade wing 92 to assist in processing as much of the working medium as possible. In use, both of the blade wings 90, 92 may drop down relatively close to the bottom of the container base, whereby the blade wings 90, 92 may process any material located in the bottom of the container.

The first blade wing 90 may include at least one trailing edge 137 and the second blade wing 92 may include at least one trailing edge 138. The trailing edges 137, 138 may be of any appropriate shape, size, type or configuration. The trailing edges 137, 138 may be located at any appropriate position on the respective blade wing 90, 92, such as located at a side of the respective blade wing 90, 92 (FIG. 10). For example, the trailing edges 137, 138 may be located adjacent to the respective wing tip 114, 116.

Figure 13:
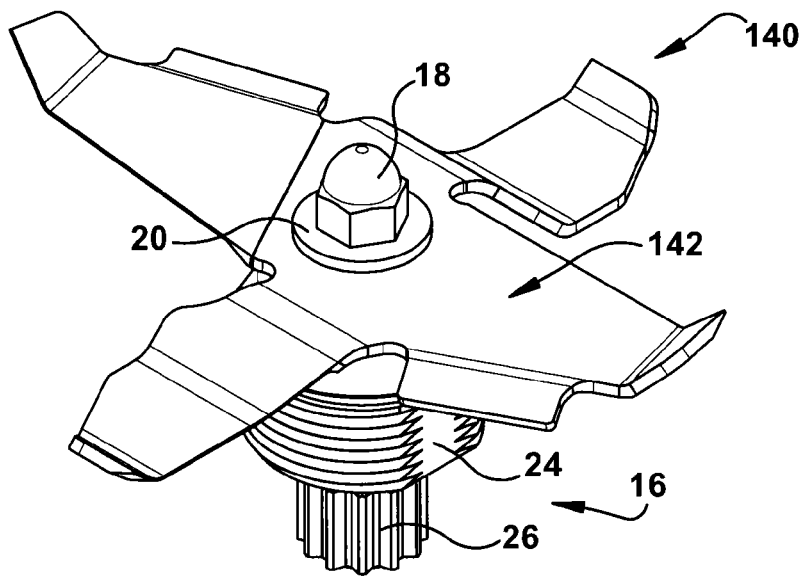
FIG. 13 illustrates a perspective view of a blade assembly in an embodiment of the present invention.
Figure 14:
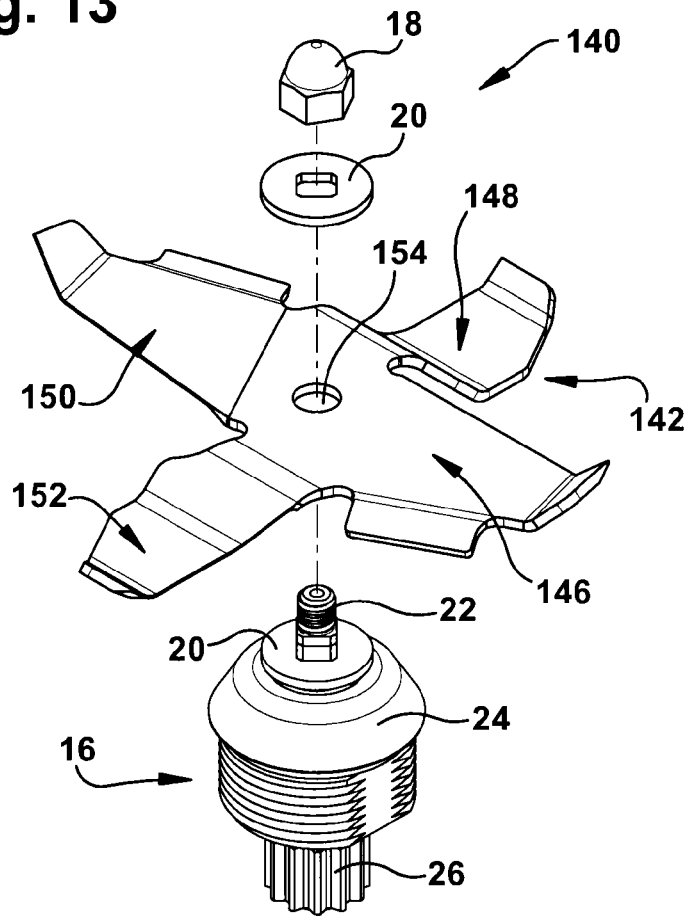
FIG. 14 illustrates a partially exploded perspective view of the blade assembly of FIG. 13.

A blade assembly 140 made in accordance with another embodiment of the present invention is illustrated in FIGS. 13 and 14. The blade assembly 140 may be of any appropriate shape, size, type or configuration. The blade assembly 140 may be utilized for any appropriate purpose. For example, the blade assembly 140 may be utilized in a blending apparatus to make a blended beverage, such as a drink made with a portion of liquid and a portion of ice, as may often be prepared and served in restaurants, cocktail lounges, or the like.

The blade assembly 140 may be utilized within any appropriate blender container (not shown). The blender container may be of any appropriate shape, size, type or configuration. For example, the blender container may be container having a narrow base or a container having a wide base. Similar to the blade assembly 10, the blade assembly 140 may be utilized in either a narrow based container or a wide based container. Moreover, the blade assembly 140 may be utilized to process as little as 6 ounces up to approximately 48 ounces of working medium in a wide based container.

The blade assembly 140 may include a blade 142 and a mounting assembly 16 (FIGS. 13 and 14). The mounting assembly 16 may be of any appropriate shape, size, type or configuration and include any appropriate number of types of components. For example, the mounting assembly 16 may include a nut 18, at least one washer 20, a shaft 22, a mount 24 and a spline 26 (FIGS. 13 and 14). The mounting assembly 16 may also include any other various components (not shown). The nut 18 may be of any appropriate shape, size, type or configuration, such as an acorn nut or a cap nut. The mounting assembly 16 may include any appropriate number of washers 20, such as a pair of washers. The washers 20 may be of any appropriate shape, size, type or configuration.

The shaft 22 may be of any appropriate shape, size, type or configuration, such as blender shaft. The mount 24 may be of any appropriate shape, size, type or configuration, such as of a generally cone shaped configuration that may include a lower threaded section. For example, when assembled the cone shaped configuration of the mount 24 may comprise a general downward angle relative to the shaft 22. The spline 26 may be of any appropriate shape, size, type or configuration.

In a non-limiting example, when assembled, the spline 26 may be secured to an end of the shaft 22 and the mount 22 may be engaged with the shaft 22, such as at a location above the spline 26. There may also be a washer 20 located on the shaft 22, such as located above the mount 22. When assembled, the blade 142 may be located above the washer 20 on the shaft 22. The blades 142 may be secured to the shaft 22 by another washer 20 and the nut 18 (FIGS. 13 and 14).

Figure 15:
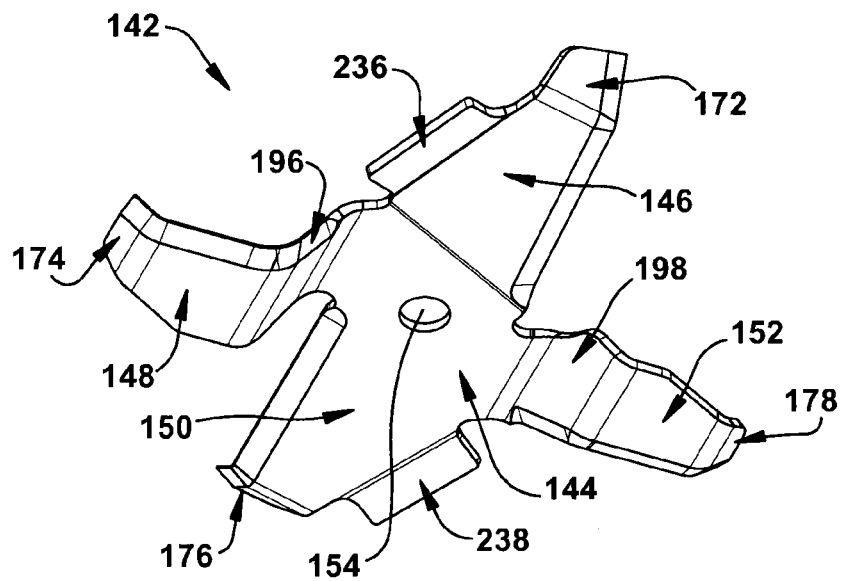
FIG. 15 illustrates a bottom perspective view of a blade of the blade assembly of FIG. 13.
Figure 16:
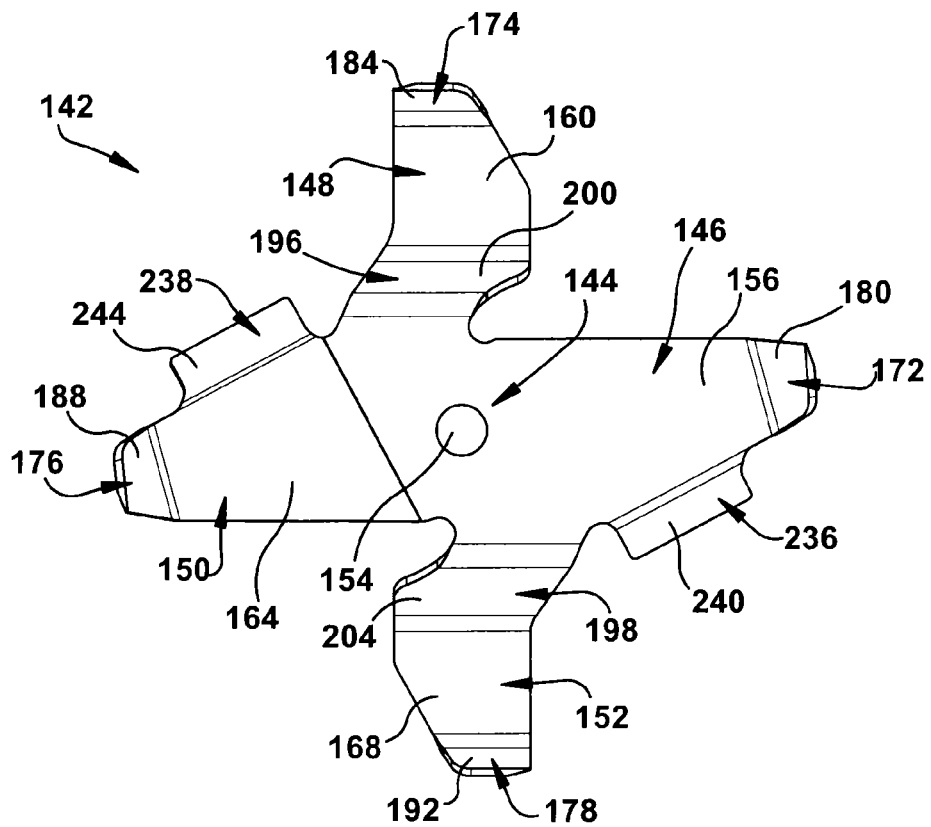
FIG. 16 illustrates a top view of the blade of FIG. 13.
Figure 17:
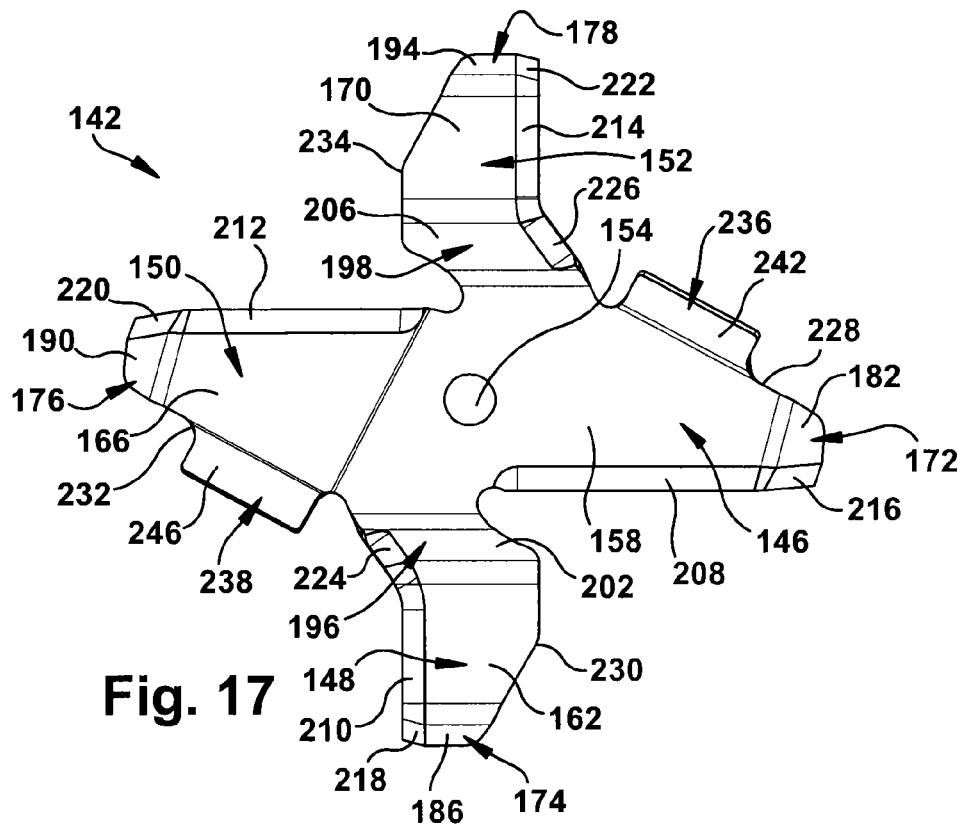
FIG. 17 illustrates a bottom view of the blade of FIG. 13.
Figure 18:
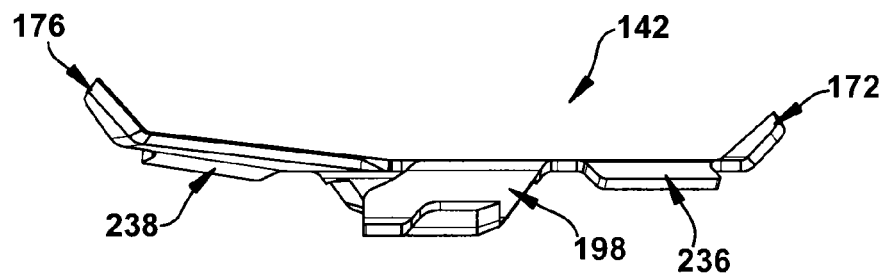
FIG. 18 illustrates a front view of the blade of FIG. 13.

The blade 142 is illustrated in FIGS. 15-19. The blade 142 may be of any appropriate shape, size, type or configuration, such as of a general plus sign configuration. The blade 142 may include a body portion 144 having an aperture 154 (FIGS. 15-17). The aperture 154 may be of any appropriate shape, size, type or configuration, such as of a generally square or circular configuration. The aperture 154 may be located at any appropriate position on the blade 142, such as located at an approximately central location on the body portion 144 (FIGS. 15-17).

The aperture 154 may be of a shape and size to receive the blender shaft 22 to which the blade 142 may be fixedly attached. The blender shaft 22 may rotate in any appropriate direction to drive the movement of blade 142 inside the blender container. As such, the center of the aperture 154 and the blender shaft 22 may define an axis of rotation of the blade 142 (FIG. 14).

The blade 142 may be configured for counter-clockwise rotation in the blender container. The blade 142 may include a first blade wing 146, a second blade wing 148, a third blade wing 150 and a fourth blade wing 152 (FIGS. 15-17). The blade wings may be integrally 146, 148, 150, 152 formed with one another. The blade wings 146, 148, 150, 152 may be located and oriented in any appropriate positions on the blade 142. For example, the first blade wing 146 and third blade wing 150 may be located opposite of one another and the second blade wing 148 and the fourth blade wing 152 may be located opposite of one another. In addition, the first and third blade wings 146, 150 may be of similar configurations and the second and fourth blade wings 148, 152 may be of similar configurations.

The first blade wing 146 may be of any appropriate shape, size, type or configuration, such as of a generally polygonal configuration. The first blade wing 146 may be located at any appropriate position on the blade 142, such as located on one side of the body portion 144. The first blade wing 146 may include an upper surface 156 and a lower surface 158 (FIGS. 16 and 17).

The third blade wing 150 may be of any appropriate shape, size, type or configuration, such as of a generally polygonal configuration (FIGS. 15-17). The third blade wing 150 may be located at any appropriate position on the blade 142, such as located on a side of the body portion 144 opposite that of the first blade wing 146 (FIGS. 15-17). For example, the first blade wing 146 and the third blade wing 150 may extend outwardly from the body portion 144 in opposite directions. The third blade wing 150 may include an upper surface 164 and a lower surface 166.

The first blade wing 146 and third blade wing 150 may be asymmetrically disposed relative to body portion 144. For example, first blade wing 146 may share the same horizontal plane as the body portion 144. Consequently, the body portion 144 and the first blade wing 146 may be uniformly connected, whereby there may be a smooth transition between their respective upper and lower surfaces.

The third blade wing 150, unlike the first blade wing 146, may be oriented at any appropriate angle, such as an acute angle, with respect to the horizontal plane shared by the body portion 144 and the first blade wing 146. In other words, the upper surface 164 of the third blade wing 150 may be obtusely oriented with respect to the body portion 144, and the lower surface 166 may be reflexively oriented with respect to the body portion 144 (FIGS. 16 and 17).

Figure 19:
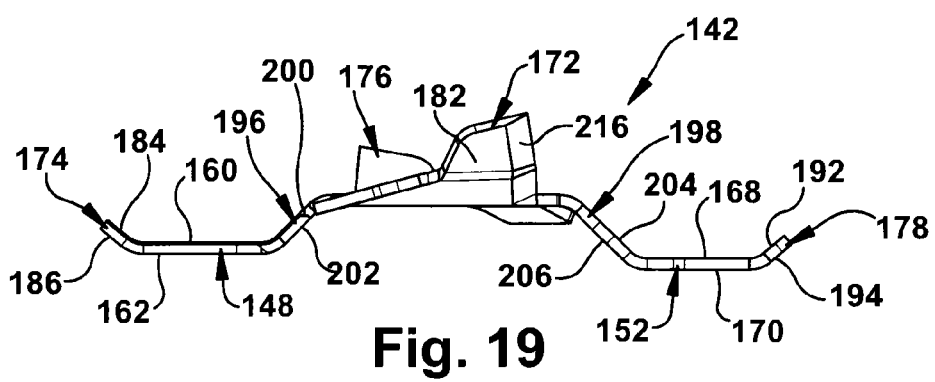
FIG. 19 illustrates a side view of the blade of FIG. 13.

The blade 142 may include a pair of transition sections 196, 198 (FIGS. 16 and 17). The transition sections 196, 198 may be of any appropriate shape, size, type or configuration, such as of a generally rectangular configuration. The transition sections 196, 198 may be located at any appropriate position on the blade 142, such as located on opposite sides of the body portion 144. For example, the transition section 196 may extend outwardly and at an angle away from one side of the body portion 144, and the other transition section 198 may extend outwardly and at an angle away from the opposite side of the body portion 144 (FIGS. 16, 17 and 19). The transition sections 196, 198 may extend outwardly at a downward angle that may be similar or approximate to the angle of the mount 24, whereby the downward angles of the transition sections 196, 198 may correspond to the angle of the mount 24.

The transition section 198 of the fourth blade wing 152 may be slightly larger than the transition section 196, whereby the transition section 198 may extend farther downwards than the transition section 196 (FIG. 19). The transition sections 196, 198 may each include an upper surface 200, 204 and a lower surface 202, 206, respectively (FIGS. 16 and 17). The transition sections 196, 198 may extend away from the body portion 144 at any appropriate angles. For example, the transition sections 196, 198 may extend away from the body portion 144 at approximately similar or differing angles. The transition sections 196, 198 may extend away from the body portion 144 at obtuse angles. In other words, the lower surfaces 202, 206 of the transition sections 196, 198 may be obtusely oriented with respect to the body portion 144 (FIG. 19).

The second blade wing 148 may be of any appropriate shape, size, type or configuration, such as of a generally polygonal configuration. The second blade wing 148 may be located at any appropriate position on the blade 142, such as located on one side of the body portion 144 (FIGS. 15-17). For example, the second blade wing 148 may be located and extend from the transition section 196. The second blade wing 148 may include an upper surface 160 and a lower surface 162 (FIGS. 16 and 17).

The fourth blade wing 152 may be of any appropriate shape, size, type or configuration, such as of a generally polygonal configuration. The fourth blade wing 152 may be located at any appropriate position on the blade 142, such as located on a side of the body portion 144 opposite that of the second blade wing 148 (FIGS. 15-17). For example, the fourth blade wing 152 may be located and extend from the transition section 198. The fourth blade wing 152 may include an upper surface 168 and a lower surface 170.

The second blade wing 148 and fourth blade wing 152 may be asymmetrically disposed or may be a general opposite mirror image of one another relative to body portion 144. The body portion 144, transition section 196 and second blade wing 148 may all be uniformly connected, whereby there may be a smooth transition between their respective upper surfaces 200, 160 and lower surfaces 202, 162 (FIGS. 16 and 17). Similarly, the body portion 144, transition section 198 and fourth blade wing 152 may all be uniformly connected, whereby there may be a smooth transition between their respective upper surfaces 204, 168 and lower surfaces 206, 170.

The second blade wing 148 may be oriented at any appropriate angle, such as an obtuse angle with respect to the transition section 196. In other words, the upper surface 160 of the second blade wing 148 may be obtusely oriented with respect to the upper surface 204 of the transition section 196 (FIGS. 16, 17 and 19). The fourth blade wing 152 may be oriented at any appropriate angle, such as an obtuse angle with respect to the transition section 198. In other words, the upper surface 168 of the fourth blade wing 152 may be obtusely oriented with respect to the upper surface 204 of the transition section 198. The body portion 144, second blade wing 148 and fourth blade wing 152 may all generally be parallel to one another.

The first blade wing 146 may include a first wing tip 172, the second blade wing 148 may include a second wing tip 174, the third blade wing 150 may include a third wing tip 176 and the fourth blade wing 152 may include a fourth wing tip 178 (FIGS. 16 and 17). The wing tips 172, 176 may be of any appropriate shape, size, type or configuration, such as of a generally polygonal configuration. The wing tips 172, 176 may be located at any appropriate position on the first blade wing 146 and third blade wing 150, respectively. For example, the first wing tip 172 and third wing tip 176 may extend outwardly from distal ends of the first blade wing 146 and third blade wing 150, respectively (FIGS. 16 and 17).

The wing tips 174, 178 may be of any appropriate shape, size, type or configuration, such as of a generally polygonal configuration. The wing tips 174, 178 may be located at any appropriate position on the second blade wing 148 and fourth blade wing 152, respectively. For example, the second wing tip 174 and fourth wing tip 178 may extend outwardly from distal ends of the second blade wing 148 and fourth blade wing 152, respectively (FIGS. 16 and 17).

The wing tips 172, 176 of the first and third blade wings 146, 150 may each include an upper surface 180, 188 and a lower surface 182, 190, respectively (FIGS. 16 and 17). The upper surfaces 180, 188 may be oriented at obtuse angles with respect to the upper surfaces 156, 164 of the blade wings 146, 150. These angled relationships between the first blade wing 146 and first wing tip 172 and between the third blade wing 150 and third wing tip 176 may increase the dimensions of the cutting patterns of the blade 142.

The wing tips 174, 178 of the second and fourth blade wings 148, 152 may each include an upper surface 184, 192 and a lower surface 186, 194, respectively (FIGS. 16 and 17). The upper surfaces 184, 192 may be oriented at obtuse angles with respect to the upper surfaces 160, 168 of the blade wings 148, 152. These angled relationships between the second blade wing 148 and second wing tip 174 and between the fourth blade wing 152 and fourth wing tip 178 may increase the dimensions of the cutting patterns of the blade 142.

The first blade wing 146 and the third blade wing 150 may each include at least one leading edge 208, 212, respectively. The leading edges 208, 212 may be of any appropriate shape, size, type or configuration, such as of a generally beveled configuration. The leading edges 208, 212 may be located at any appropriate position on the respective blade wing 146, 150, such as located at a side of the respective blade wing 146, 150 (FIG. 17).

The first wing tip 172 and the third wing tip 176 may each include at least one leading edge 216, 220, respectively. The leading edges 216, 220 may be of any appropriate shape, size, type or configuration, such as of a generally beveled configuration. The leading edges 216, 220 may be located at any appropriate position on the respective wing tip 172, 176, such as located at a side of the respective wing tip 172, 176 (FIG. 17).

The transition section 196 and transition section 198 may each include at least one leading edge 224, 226, respectively. The leading edges 224, 226 may be of any appropriate shape, size, type or configuration, such as of a generally beveled configuration. The leading edges 224, 226 may be located at any appropriate position on the respective transition section 196, 198, such as located at a side of the respective transition section 196, 198 (FIG. 17).

The second blade wing 148 and the fourth blade wing 152 may each include at least one leading edge 210, 214, respectively. The leading edges 210, 214 may be of any appropriate shape, size, type or configuration, such as of a generally beveled configuration. The leading edges 210, 214 may be located at any appropriate position on the respective blade wing 148, 152, such as located at a side of the respective blade wing 148, 152 (FIG. 17).

The second wing tip 174 and the fourth wing tip 178 may each include at least one leading edge 218, 222, respectively. The leading edges 218, 222 may be of any appropriate shape, size, type or configuration, such as of a generally beveled configuration. The leading edges 218, 222 may be located at any appropriate position on the respective wing tip 174, 178, such as located at a side of the respective wing tip 174, 178 (FIG. 17).

The cutting patterns of the blade 142 may be defined by the leading edges 208, 212 of the first blade wing 146 and third blade wing 150, respectively, and by the leading edges 216, 220 of the first wing tip 172 and third wing tip 176, respectively. The cutting patterns of the blade 142 may also be defined by the leading edges 224, 210, 218 of the transition section 196, second blade wing 148 and second wing tip 174, respectively. The cutting patterns of the blade 142 may be further defined by the leading edges 226, 214, 222 of the transition section 198, fourth blade wing 152 and fourth wing tip 178, respectively.

The leading edges 208, 212, 216, 220 may be sharpened by respectively beveling the first blade wing 146, third blade wing 150, first wing tip 172 and third wing tip 176. In addition, the leading edges 224, 226, 210, 214, 218, 222 may be sharpened by respectively beveling the transition section 196, transition section 198, second blade wing 148, fourth blade wing 152, second wing tip 174 and fourth wing tip 178.

The first blade wing leading edge 208 and the first wing tip leading edge 216 may be formed along one side of the blade 142 and may share cutting responsibilities along that side of the blade 12. The second blade wing leading edge 212 and the second wing tip leading edge 220 may be formed along the other side of blade 142 and may share cutting responsibilities along that side of the blade 142. Therefore, as the blade 142 rotates counter-clockwise about its axis of rotation, the leading edges 208, 216 located on one side and the leading edges 212, 220 located on the other side of the blade 142 may cut through the working medium provided in the blender container.

Since the first blade wing 146 and the third blade wing 150 may be asymmetrically oriented with respect to the body portion 144, the blade 142 may have two cutting patterns. The first cutting pattern may be substantially planar and may be formed by the leading edge 208 of the first blade wing 146 and the leading edge 216 of the first wing tip 172. The second cutting pattern may be substantially frusto-conical and may be formed by the leading edge 212 of the third blade wing 150 and the leading edge 220 of the third wing tip 176.

The leading edges 224, 210, 218 of one side of the second blade wing 148 may all be formed along one side of the blade 142 and may form a general continuous beveled surface or leading edge from the approximate center of the body portion 144 all the way to the wing tip 174, and may share cutting responsibilities along that side of the blade 142 (FIG. 17). In addition, the leading edges 226, 214, 222 of the opposite side of the fourth blade wing 152 may all be formed along the other side of the blade 142 and may form a general continuous beveled surface or leading edge from the approximate center of the body portion 144 all the way to the wing tip 178, and may share cutting responsibilities along that side of the blade 142 (FIG. 17). Therefore, as the blade 142 rotates about its axis of rotation, the leading edges 224, 210, 218 located on one side and the leading edges 226, 214, 222 located on the other side of the blade 142 may cut through the working medium provided in the blender container.

The blade 142 may have two cutting patterns. The first cutting pattern may be substantially planar and may be formed by the leading edges 224, 210, 218. The second cutting pattern may also be substantially planar and may be formed by the leading edges 226, 214, 222. In addition, the fourth blade wing 152 may be located slightly lower than the second blade wing 148 to assist in processing as much of the working medium as possible. In use, both of the blade wings 148, 152 may drop down relatively close to the bottom of the container base, whereby the blade wings 148, 152 may process any material located in the bottom of the container, thus enabling processing of lower volumes (6-12 ounces) of working medium in a wide bottom container.

The first blade wing 146 may include at least one trailing edge 228 and the third blade wing 150 may include at least one trailing edge 232 (FIG. 17). The trailing edges 228, 232 may be of any appropriate shape, size, type or configuration. The trailing edges 228, 232 may be located at any appropriate position on the respective blade wing 146, 150, such as located at a side of the respective blade wing 146, 150 (FIG. 17). For example, the trailing edges 228, 232 may be located adjacent to the respective wing tip 172, 176.

The second blade wing 148 may include at least one trailing edge 230 and the fourth blade wing 152 may include at least one trailing edge 234. The trailing edges 230, 234 may be of any appropriate shape, size, type or configuration. The trailing edges 230, 234 may be located at any appropriate position on the respective blade wing 148, 152, such as located at a side of the respective blade wing 148, 152 (FIG. 17). For example, the trailing edges 230, 234 may be located adjacent to the respective wing tip 174, 178.

The first blade wing 146 may include a wing flap 236 and the third blade wing 150 may include a wing flap 238. The wing flaps 236, 238 may be of any appropriate shape, size, type or configuration, such as of a generally rectangular configuration. The wing flaps 236, 238 may be located at any appropriate position on the respective blade wing 146, 150, such as generally opposite that of the respective leading edges 208, 212 (FIGS. 16 and 17). For example, the wing flap 236 and wing flap 238 may extend outwardly at an angle from the trailing edges 228, 232 of the first blade wing 146 and third blade wing 150, respectively. The wing flaps 236, 238 may each include an upper surface 240, 244 and a lower surface 242, 246, respectively. The lower surfaces 242, 246 of the wing flaps 236, 238 may be oriented at an obtuse angle with respect to the lower surfaces 158, 166 of the blade wings 146, 150.

As stated above in reference to the blade assembly 10, the wing flaps 236, 238 of the blade assembly 140 may also be provided to control the axial flow of the working medium relative to the first cutting pattern and second cutting pattern irrespective of the angle of attack of the first blade wing 146 and the third blade wing 150. For example, the wing flaps 236, 238 may be positioned at any appropriate angle, such as angled downwardly or upwardly, to respectively increase the effective camber of the upper surfaces 156, 164 and the lower surfaces 158, 166 of the blade wings 146, 150, respectively.

Due to the effective camber increase resulting from the addition of the wing flaps 236, 238, low pressures may be generated by the wing flaps 236, 238. The low pressures generated by the wing flaps 236, 238 may compel axial movement of the working medium.

In a non-limiting example, in use, as the blade 142 is rotating, the working medium flowing underneath blade 142 may impinge the downwardly angled wing flaps 236, 238. As such, the lower surfaces 242, 246 of the wing flaps 236, 238 may deflect the working medium away from the blade 142. Such deflection may cause the wing flaps 236, 238 to batter against the working medium, as well as push the working medium away from the path of the wing flaps 236, 238, thereby generating low pressures adjacent to the upper surfaces 240, 244 of the wing flaps 236, 238.

The low pressures generated by the downwardly angled wing flaps 236, 238 may draw the working medium to the upper surfaces 240, 244 of the wing flaps 236, 238. Moreover, because the upper surface 240 is below the leading edges 208, 216 of the first blade wing 146, and the upper surface 244 is below the leading edges 212, 220 of the third blade wing 150, the working medium may be drawn downwardly through the first cutting pattern and second cutting pattern. As such, the downward angle of the wing flaps 236, 238 and the axial movement caused thereby may enhance the cutting ability of the blade 142.

The opposite holds true if the wing flaps 236, 238 are angled upwardly. For example, as the blade 142 is rotating, the working medium flowing above the blade 142 may impinge the upwardly angled wing flaps 236, 238. As such, the upper surfaces 240, 244 of the wing flaps 236, 238 may deflect the working medium away from the path of the wing flaps 236, 238. In the process of deflecting the working medium, the wing flaps 236, 238 may batter against the working medium, thereby generating low pressures adjacent to the lower surfaces 242, 246. These low pressures may draw the working medium to the lower surfaces 242, 246. Since the lower surface 242 would be located above the leading edges 208, 216 and the lower surface 246 would be located above the leading edges 212, 220, the working medium may be drawn upwardly through the first cutting pattern and second cutting pattern. As such, the upward angle of the wing flaps 236, 238 and the axial movement caused thereby may enhance the cutting ability of the blade 142.

Whether the wing flaps 236, 238 are angled upwardly or downwardly, the amount of working medium flowing across the first cutting pattern and second cutting pattern may be increased by increasing the slopes of the wing flaps 236, 238. Furthermore, as stated above, the downward and upward angle of the wing flap 236 may draw the working medium downwardly and upwardly, respectively, through the first cutting pattern. Therefore, with reference to the first blade wing 146 (which has an angle of attack of zero), the amount and direction of the axial flow of the working medium may be controlled by the wing flap 236 irrespective of the angle of attack of the first blade wing 146.

In addition to controlling the axial flow of the working medium, the orientation of the wing flaps 236, 238 may also control the radial flow of the working medium relative to the axis of rotation of the blade 142. For example, the wing flaps 236, 238 may be canted inwardly relative to the leading edges 208, 212, respectively. That is, because the first blade wing 146 and third blade wing 150 may gradually narrow as the blade wings 146, 150 may extend outwardly from the body portion 144, the trailing edges 228, 232 may be angled such that the wing flaps 236, 238 may be canted inwardly. As such, the working medium deflected away from the path of the wing flaps 236, 238 as the blade 142 is rotating may be pushed radially inwardly relative to the first blade wing 146 and third blade wing 150, respectively.

The opposite holds true if the wing flaps 236, 238 are canted outwardly relative to the leading edges 208, 212, respectively. For example, if the first blade wing 146 and third blade wing 150 gradually broaden as the blade wings 146, 150 extend outwardly from the body portion 144, the trailing edges 228, 232 may be angled such that the wing flaps 236, 238 may be canted outwardly. As such, the working medium deflected away from the path of the wing flaps 236, 238 as the blade 142 is rotating may be pushed radially outwardly relative to the first blade wing 146 and third blade wing 150, respectively.

Therefore, both axial and radial flow may be controlled by the orientation of the wing flaps 236, 238. Moreover, when the wing flaps 236, 238 are angled downwardly, the wing flaps 236, 238 may also be used to dislodge working medium from underneath the blade 142, which after being dislodged, may then be acted on by the first cutting pattern and second cutting pattern.

Although the embodiments of the present invention have been illustrated in the accompanying drawings and described in the foregoing detailed description, it is to be understood that the present invention is not to be limited to the embodiments disclosed, but that the invention described herein is capable of numerous rearrangements, modifications and substitutions without departing from the scope of the claims hereafter.

Having thus described the invention, the following is claimed:

1. A blender blade for being mounted to an interior base of a blender container for rotation about a vertical axis, said blender blade comprising:
   a body having an aperture, wherein said body is located on a first horizontal plane;
   a first blade wing extending outwardly from said body along said first horizontal plane;
   a first transition section extending outwardly at an angle from said body;
   a second blade wing extending outwardly from said first transition section;
   a third blade wing not coplanar with said first horizontal plane and extending outwardly from said body at an angle;
   a second transition section extending outwardly at an angle from said body;
   a fourth blade wing extending outwardly from said second transition section; and
   wherein at least one of said second and said fourth blade wings is located on a second horizontal plane.

2. The blender blade of claim 1, wherein said second blade wing is located on said second horizontal plane and said fourth blade wing is located on a third horizontal plane.

3. The blender blade of claim 1, wherein at least one of said first and second transition sections extends outwardly at a downward angle away from said body.

4. The blender blade of claim 3, wherein said downward angle is approximate to an angle of a base mount.

5. The blender blade of claim 1, wherein said first blade wing and said third blade wing are generally located opposite to one another.

6. The blender blade of claim 5, wherein said second blade wing and said fourth blade wing are generally located opposite to one another.

7. The blender blade of claim 1, wherein said first blade wing and said third blade wing each include a wing flap extending downwardly at an angle from said respective blade wing.

8. The blender blade of claim 1, wherein said first, second, third and said fourth blade wings each include a wing tip extending at an upward angle therefrom and distally located from said body.

9. The blender blade of claim 1, wherein said blender blade is a one-piece metal blade.

10. The blender blade of claim 1, wherein said blender blade can process as little as 6 ounces up to approximately 48 ounces of working medium.

\* \* \* \* \*